US009860369B2

(12) United States Patent
Yarbrough et al.

(10) Patent No.: US 9,860,369 B2
(45) Date of Patent: *Jan. 2, 2018

(54) APPLICATION TRIGGERED MEDIA CONTROL IN CALL CENTERS

(71) Applicant: United Services Automobile Association (USAA), San Antonio, TX (US)

(72) Inventors: Greg Yarbrough, San Antonio, TX (US); Eric Smith, Helotes, TX (US); Vijay Jayapalan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,448

(22) Filed: Dec. 16, 2016

(65) Prior Publication Data

US 2017/0099384 A1 Apr. 6, 2017

Related U.S. Application Data

(63) Continuation of application No. 14/590,115, filed on Jan. 6, 2015, now Pat. No. 9,553,978.

(51) Int. Cl.

| | |
|---|---|
| ***H04M 1/24*** | (2006.01) |
| ***H04M 3/08*** | (2006.01) |
| ***H04M 3/22*** | (2006.01) |
| ***H04M 3/51*** | (2006.01) |
| *H04L 12/26* | (2006.01) |

(52) U.S. Cl.

CPC ....... *H04M 3/2236* (2013.01); *H04M 3/5183* (2013.01); *H04L 43/0829* (2013.01); *H04M 2201/42* (2013.01); *H04M 2203/40* (2013.01)

(58) Field of Classification Search

USPC ................. 379/1.01, 24, 26.01, 27.01, 29.01

See application file for complete search history.

(56) References Cited

U.S. PATENT DOCUMENTS

| | | | | |
|---|---|---|---|---|
| 6,014,658 | A | 1/2000 | Pretz | |
| 6,453,042 | B1 | 9/2002 | Roach et al. | |
| 6,516,055 | B1 | 2/2003 | Bedeski et al. | |
| 7,664,231 | B2 | 2/2010 | Schmidmer et al. | |
| 8,644,485 | B1 | 2/2014 | Vendrow et al. | |
| 9,553,978 | B2 * | 1/2017 | Yarbrough | H04M 3/2227 |
| 2002/0114296 | A1 | 8/2002 | Hardy | |

(Continued)

OTHER PUBLICATIONS

Begen Cisco, A., et al., "Duplicating RTP Streams," Internet Engineering Task Force (IETF), University of Glasgow, Apr. 2014, 13 pages.

(Continued)

*Primary Examiner* — Quoc D Tran

(74) *Attorney, Agent, or Firm* — Fish & Richardson P.C.

(57) ABSTRACT

Methods, systems, and apparatus, including computer programs encoded on a computer storage medium, for receiving an input from a call center agent indicating a symptom of a quality of an electronic communication between the agent and a caller. Identifying a cause of the quality of the electronic communication based on the input. And, sending instructions to adjust the cause of the quality of the electronic communication.

20 Claims, 4 Drawing Sheets

300

Call Control ? — X

Active Call

302 Phone Number: 555-555-5555
Caller Name: Ann Johnson
Account Number: 153-40-123

304 Choppy
Inaudible
Static
Too Quiet

Select

306

(56) References Cited

U.S. PATENT DOCUMENTS

| | | | |
|---|---|---|---|
| 2003/0018535 | A1 | 1/2003 | Eisenberg |
| 2003/0227870 | A1 | 12/2003 | Wagner et al. |
| 2004/0153320 | A1 | 8/2004 | Nahkla et al. |
| 2006/0098625 | A1 | 5/2006 | King et al. |
| 2006/0187824 | A1 | 8/2006 | Huang et al. |
| 2007/0019618 | A1 | 1/2007 | Shaffer et al. |
| 2008/0175228 | A1 | 7/2008 | Chang et al. |
| 2013/0090922 | A1 | 4/2013 | Lim et al. |
| 2013/0250786 | A1 | 9/2013 | Balasaygun et al. |

OTHER PUBLICATIONS

Copenheaver, International Search Report & Written Opinion for International application No. PCT/US2015/064230, dated Feb. 5, 2016, 10 pages.

International Preliminary Report on Patentability in International Application No. PCT/US2015/064230, dated Jul. 11, 2017, 9 pages.

* cited by examiner 200
106 Call Center
Call Center Core Network
118
Network
110
User Input
Inst.
A
B
C
D
116
122
124
130
130a
130b
120
126
102
104
112
114
202
204
206

APPLICATION TRIGGERED MEDIA CONTROL IN CALL CENTERS

CROSS-REFERENCE TO RELATED APPLICATION

This application is a continuation application of and claims priority to U.S. application Ser. No. 14/590,115, filed on Jan. 6, 2015, the entirety of which is hereby incorporated by reference into the present disclosure.

BACKGROUND

Call centers are used to provide, among other services, customer support, technical support, and product/service ordering services to callers. In some circumstances, the audio quality of a call may be degraded making communications between call center personnel and a caller difficult. Moreover, at times only one party of the call may be aware of the degraded communication. Furthermore, the degraded communication quality may be caused by a problem with the communication device used by the party who is not experiencing the degraded quality such that attempts to correct the problem by adjusting settings of the communication device used by the party who is experiencing the degraded communication may be ineffective.

SUMMARY

This specification relates to systems and methods for remediating poor communication channel quality by controlling call attributes of a communication device used by a first party to a call based on input received from a second party to the call.

Implementations of the present disclosure generally provide one party to an electronic communication (e.g., a customer service representative (CSR)) with the ability to remediate poor quality electronic communications by inputting one or more symptoms of the poor quality communication. More specifically, when the quality of an ongoing customer call becomes degraded and the CSR's own communication device is not because of the degradation, the CSR can provide input indicating one or more symptoms the poor quality electronic communication. A call control system can identify a cause of the poor quality electronic communication based on the CSR's input and send instructions to remediate the cause and improve the electronic medication. In some implementations, the call control system may issue instructions to adjust one or more settings or call attributes of a communication device used by the other party engaged in the electronic communication (e.g., a caller to the call center).

In general, innovative aspects of the subject matter described in this specification can be embodied in methods that include actions of receiving an input from a call center agent indicating a symptom of a quality of an electronic communication between the agent and a caller. Identifying a cause of the quality of the electronic communication based on the input. And, sending instructions to adjust the cause of the quality of the electronic communication. Other implementations of this aspect include corresponding systems, apparatus, and computer programs, configured to perform the actions of the methods, encoded on computer storage devices.

These and other implementations can each optionally include one or more of the following features. Identifying the cause of the quality of the electronic communication may include obtaining at least one performance metric related to the electronic communication, and determining the cause of the poor quality electronic communication based on the input and the at least one performance metric. Identifying the cause of the quality of the electronic communication based on the input and the at least one performance metric may include obtaining analysis results from at least one analytic performed on the input and the at least one performance metric.

The at least one performance metric may include at least one of a mean-opinion score (MoS) or a packet loss rate. The at least one performance metric may include a performance metric for a communication device used by the caller. The performance metric for the communication device used by the caller may include at least one of a battery charge level, a codec performance metric, a processor performance metric, a number of running processes, a number of running applications, a gain setting, or a packet retransmission rate.

The instructions may include instructions to change a function of a communication device used by the caller. The instructions may include instructions to adjust a gain setting of a communication device used by the caller. The instructions may include instructions to close an application running on a communication device used by the caller. The instructions may include instructions to establish a redundant communication path for the electronic communication.

The actions may further include providing a notification, for display on the communication device used by the caller, that a change has been made to a function of the caller's communication device. The actions may further include providing, for display to the call center agent, a graphical user interface. The graphical user interface may include a user selectable list of symptoms related to poor electronic communications quality, and the input indicating a symptom of the quality of the electronic communication between the agent and the caller may include a selection of an item from the user selectable list of symptoms.

Particular implementations of the subject matter described in this specification can be implemented so as to realize one or more of the following advantages. Implementations may improve the quality of real-time electronic communication by adapting communication quality to the perception of a particular party to the communication. Some implementations may permit one party to an electronic communication to address quality degradation that is unperceived by the other party.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure generally provide one party to an electronic communication (e.g., a customer service representative (CSR)) with the ability to remediate poor quality electronic communications by inputting one or more symptoms of the poor quality communication (e.g., choppy, inaudible, static). More specifically, when the quality of an ongoing customer call becomes degraded and the CSR's own communication device is not because of the degradation, the CSR can provide input indicating one or more symptoms the poor quality electronic communication. A call control system can identify a cause of the poor quality electronic communication based on the CSR's input and send instructions to remediate the cause and improve the electronic medication. In some implementations, the call control system may issue instructions to adjust one or more settings or call attributes of a communication device used by the other party engaged in the electronic communication (e.g., a caller to the call center).

Implementations of the present disclosure will be discussed in further detail with reference to an example context, however, it should be appreciated that the implementations discussed may be applicable more generally to any duplex electronic communication. The example context includes a telephone call to a customer service call center. It is also appreciated, however, that implementations of the present disclosure can be realized in other appropriate other contexts, for example, any two party telephone call, conference calls, video chat calls, or any other appropriate electronic communication. In addition, implementations of the present disclosure will be discussed in reference to "calls" (e.g., telephone calls) made to and from a call center. Although discussed in reference to the common telephone "call;" the implementations described may be performed on any appropriate real-time duplex communication media stream (e.g., electronic communication) which may be used to contact a CSR at a call center. For example, the implementations described may be performed on any electronic communications between a CSR and a caller including, but not limited to, telephone, video telephone, chat (e.g., IM, Jabber), video chat (e.g., Skype, Facetime), internet based meetings (e.g., WebEx), and conference call systems.

Figure 1:
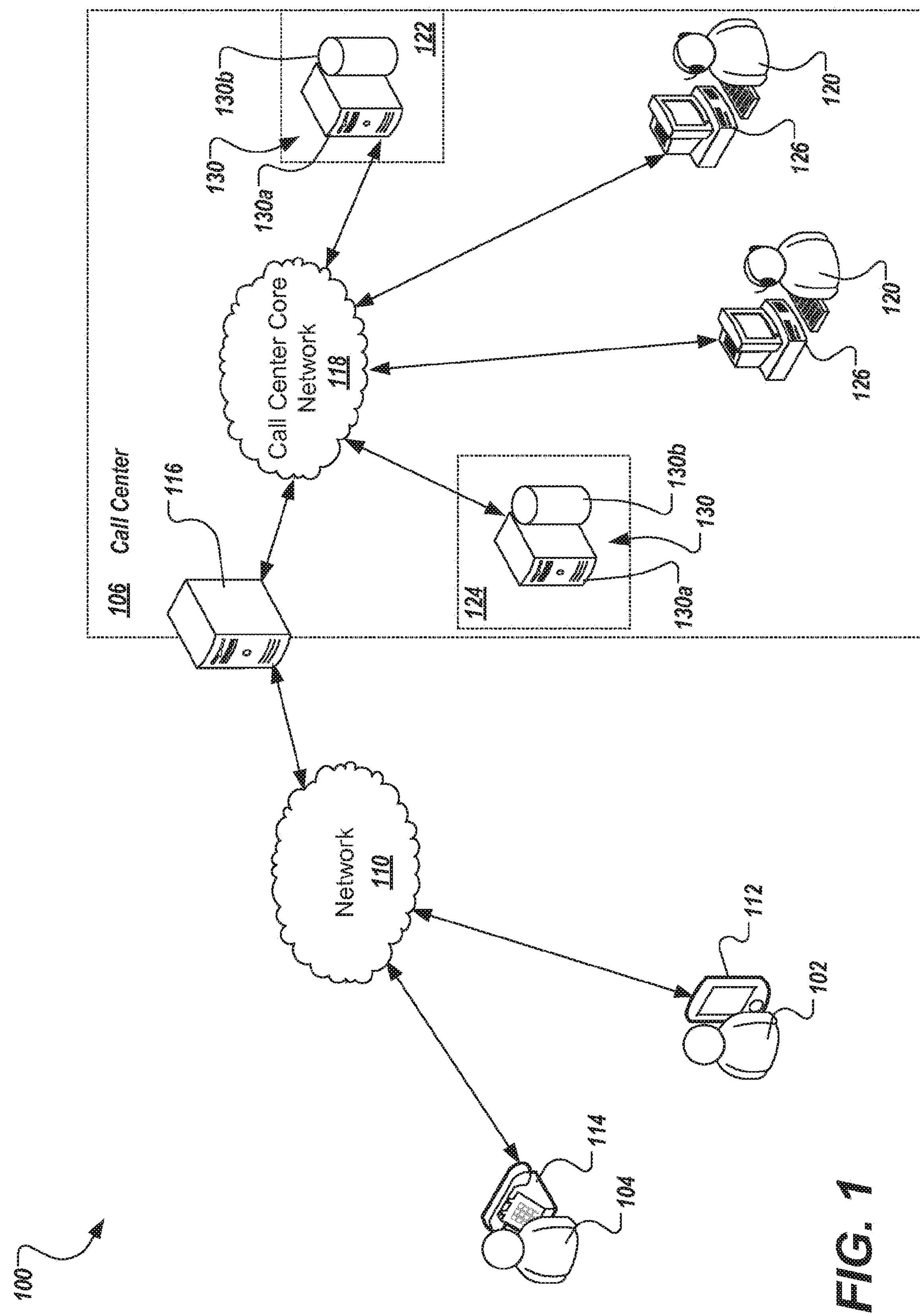
FIG. 1 depicts an example system in accordance with implementations of the present disclosure.

FIG. 1 depicts an example system 100 that can execute implementations of the present disclosure. The example system 100 is illustrated in a call center environment, including callers 102, 104, and a call center 106. The call center 106 may be either an inbound, outbound, or blended call center, for example, a customer service center, a product or service order center, a technical support center, a telephone answering service, or a telemarketing center. Callers 102, 104 may be, for example, customers or potential customers seeking to purchase or support for various products or services. Callers 102, 104 also may be potential prospects whom an organization (e.g., business, non-profit organization, or political organization) would like to contact.

Callers 102, 104 communicate with call center 106 via communication devices 112, 114 over network 110. In some examples, communication devices 112, 114 can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network 110 can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers. In some examples, the network 110 can be referred to as an upper-level network.

Call center 106 may include, for example, one or more network edge devices 116, a call center network 118, an automated menu system 122, a call control system 124, agents 120 (e.g., CSRs), and agent workstations 126. In some examples, network edge device 116 is a network device used to provide an entry point into a call center's 106 internal network (e.g., call center network 118) including, but not limited to, a server, a router, a switch, a gateway, or other appropriate network device or combination of network devices. In some examples, automated menu system 122 can include a touch-tone system, an interactive voice response system (IVR), or any other appropriate caller menu system or combination of automated caller menu systems.

Agents 120 may make and receive customer calls at workstations 126. In some examples, a workstation 126 can include one or more computing devices and one or more communication devices (e.g., similar to communication devices 112 and/or 114 described above). Computing devices can be any type of computing device with which an agent 120 can access information related to customer calls (e.g., customer account information, marketing information, call lists, technical support information, product information and/or service information). Computing devices may include, but are not limited to, one or more desktop computers, laptop computers, notebook computers, tablet computers, and other appropriate devices.

In some implementations, agents 120 and workstations 126 may not be physically located at the call center 106, but may be geographically remote from the call center 106. For example, agents 120 may work from a home office and access call center network 118 over network 110 and via a virtual private network (VPN).

Call center systems such as automated menu system 122 and call control system 124 include one or more computing systems 130. The computing systems 130 can each include a computing device 130*a* and computer-readable memory provided as a persistent storage device 130*b*, and can represent various forms of server systems including, but not limited to a web server, an application server, a proxy server, a network server, or a server farm.

In some examples, implementations of the present disclosure may be performed by a call control application. A call control application may be stored at and executed by one or more computing systems 130 or workstations 126 such as, for example, call control system 124. Generally, for the purpose of this disclosure, an example call control application will be referred to as operating on call control system 124. However, in some examples, a call control application may be stored at and executed by multiple computing systems 130, workstations 126, and/or communication devices (112, 114). For example, a call control application may include various modules stored on and executed by different computing systems 130, communication devices (112, 114), or workstations 126. For instance, user interface modules may be stored at and executed by workstations 126 or communication devices (112, 114), and a framework module may be stored at and executed by computing systems 130 (e.g., call control system 124). In some implementations, a call control application may be one or more web-based applications accessed and executed via call center network 118 and network 110. For example, a call control system 124 may be external to the call center 106 (such as external system 108). In some examples, the call control system 124 may be part of the call center 106, but an agent 120 may be working from a home agent workstation 126 external to the call center.

Figure 2:
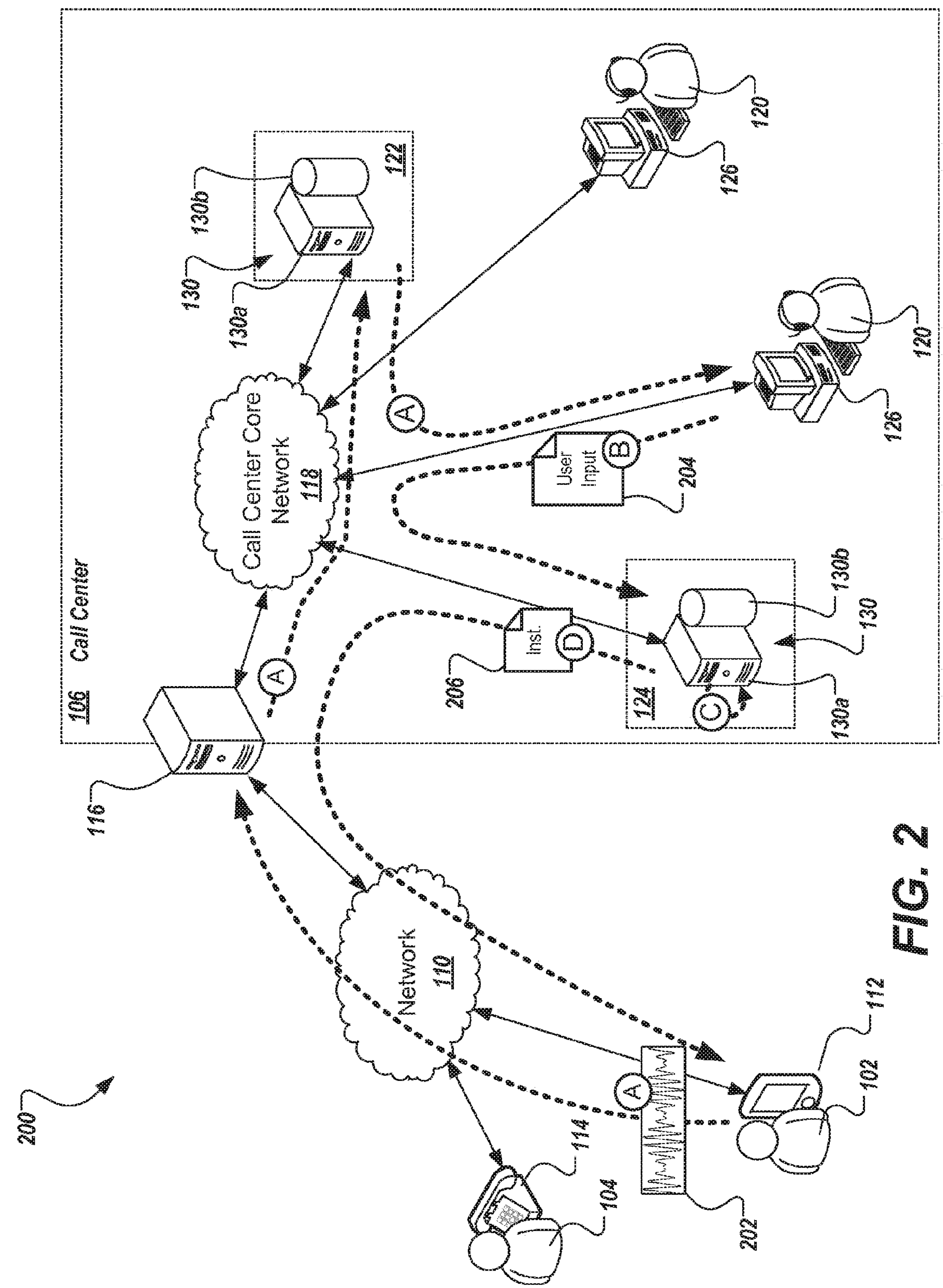
FIG. 2 depict an example call control process flow within the example system.

FIG. 2 depicts an example process flow for a call control process 200 within the example system 100. The process illustrated in FIG. 2 is an example process 200 performed by an example call control application operating on system 100. In this example, a call 202 is received at a call center 106, and the call 202 is transferred to a call center agent 120 through the call center network 118. During the course of the call 202, the call control system 124 receives an input 204 from an agent 120 indicating one or more symptoms of poor call quality. The call control system 124 identifies a cause of the poor call quality based on the input, and sends instructions to remediate the cause of the poor call quality. In some implementations, the instructions can include adjusting a setting or a call attribute of a caller's (102, 104) communication device (112, 114).

In more detail, during state (A), call center 106 receives a call 202 from caller 102, and transfers the call to an agent 120. For example, a call center's 106 network edge device 116 receives a customer call 202, passes the call 202 to the call center network 118, where the call 202 is processed by the computing systems 130 (e.g., automated menu system) within the call center network 118, and is ultimately transferred to agent 120. As noted above, the call 202 may be any appropriate real-time duplex communication media stream which may be used to contact a CSR (agent) at a call center. For example, the call 202 may be conducted using any electronic communication between caller 102 and agent 120 including, but not limited to, telephone, video telephone, chat (e.g., IM, Jabber), video chat (e.g., Skype, Facetime), internet based meetings (e.g., WebEx), and conference call systems. In addition, the call may be a media stream of a multicast communication (e.g., a conference call).

During state (B), call control system 124 receive an input 204 from agent 120 indicating one or more symptoms of poor call quality. For example, a call control graphical user interface (GUI) (e.g., such as the example GUI shown in FIG. 3 and described below) may be presented to agent 120 including a list of poor call quality symptoms (e.g., choppy, inaudible, static). The input 204 may then be a user selection of one or more symptoms from the list presented in the GUI.

During state (C), the call control system 124 identifies a cause of the poor quality electronic communication between caller 102 and agent 120. The call control system 124 may employ one or more computer analytics (e.g., a rules engine or a machine learning algorithm) to obtain analysis results based on the input 204. In some implementations, the call control system 124 may obtain one or more performance metrics related to electronic communication to aid in identifying a cause of the poor quality communication (e.g., a mean-opinion score (MoS) or a packet loss rate). The call control system 124 may employ the one or more computer analytics to obtain analysis results based on the input 204 and the performance metrics.

In some implementations, the call control system 124 may obtain one or more performance metrics related to a communication device used by the caller (e.g., communication device 112 or 114) to aid in identifying a cause of the poor quality communication. The call control system 124 may employ the one or more computer analytics to obtain analysis results based on the input 204 and the performance metrics. For example, performance metrics for a caller's 102 communication device 112 may include, but are not limited to, a battery charge level, a codec performance metric, a processor performance metric, a number of running processes, a number of running applications, a gain setting, or a packet retransmission rate. In such implementations, call control system 124 may be granted access to communication device 112 through, for example, a call control application executing on caller's 102 communication device 112 (e.g., a call control mobile application).

In some implementations, the one or more computer analytics may be performed based on the input 204 and both the one or more performance metrics related to electronic communication and the one or more performance metrics related to the caller's 102 communication device 112. For example, the input 204 may indicate that an ongoing call is inaudible, however, electronic communication performance metrics may indicate that a packet retransmission rate for the call is satisfactory. In such an example the cause of the inaudible call may be associated with the 102 communication device 112. For example, a microphone gain setting on the communication device 112 may be too low. Thus, incorporating performance metrics related to communication device 112 may improve the accuracy of identifying a cause of a poor quality electronic communication.

During state (D), the call control system sends instructions to remediate the cause of the poor quality electronic communication. In some examples, the instructions may be sent to one or more servers in the communication path between the communication device 112 in the call center agent's 120 communication device (e.g., agent workstation 126). For example, the instructions may be to establish a redundant communication path or activate a dormant redundant path in order to improve the bandwidth available for the communication or to establish a less noisy channel. In some examples, the instructions may be sent to a caller's 102 communication device 112. For example, instructions may include changing a function or setting of the caller's 102 communication device 112 (e.g., increasing a microphone gain setting, closing one or more running applications, adjusting a codec setting, etc.). For instance, continuing the example above of the inaudible call, the instructions may be to increase a gain of a microphone in the communication device 112.

In some implementations, the instructions may include instructions to send a notification to the caller's 102 communication device 112, for example, to inform the caller 102 that the call may be lost. In some examples, the notification may inform the caller 102 that a change has been made or setting has been adjusted on the caller's 102 communication device 112.

Figure 3:
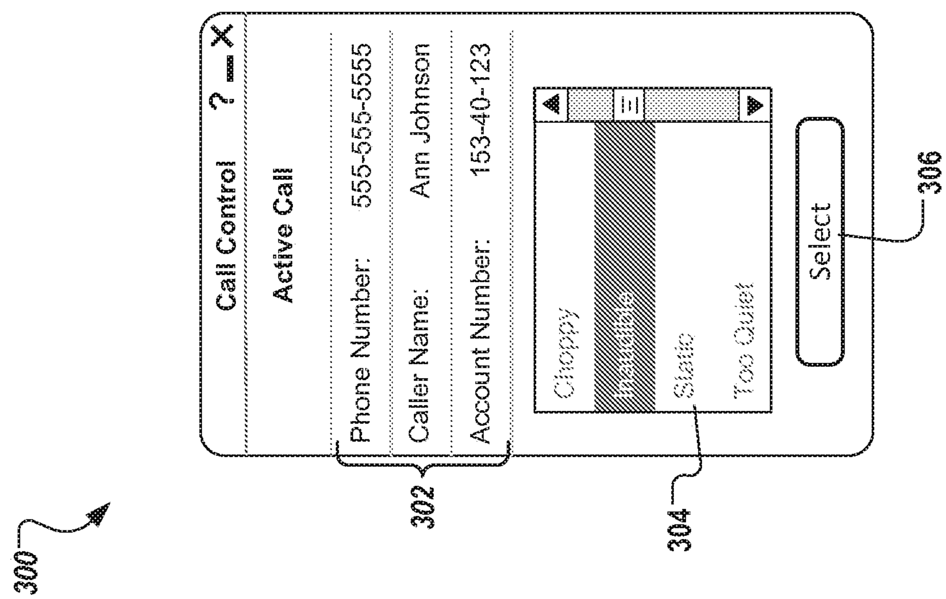
FIG. 3 depicts an example graphical user interfaces (GUI) in accordance with implementations of the present disclosure.

FIG. 3 depicts an example graphical user interfaces (GUI) 300 in accordance with implementations of the present disclosure. For example, GUI 300 may be included in a call control application and displayed on agent workstations 126. GUI 300 includes call information 302 associated with an active call, a selection menu 304, and a selectable control 306. In some examples, call information 302 can include, but is not limited to, information such as a phone number of a caller (e.g., 555-555-5555), the caller's name (e.g., Ann Johnson), and an account number associated with the caller (e.g., 153-40-123).

In some examples, as described above, if the quality of an active call is degrade an agent may be permitted to select one or more symptoms of the poor call quality using selection menu 304 (e.g., a user selectable list of symptoms). For example, an agent may indicate that a call is choppy, inaudible, static, or too quiet. When the agent selects control 306 data defining the agent's input may be sent from an agent workstation to a call control system. Selection of the control 306 may also cause the call control application to begin identifying the cause for the poor call quality and attempt to remediate the problem, as described above.

Figure 4:
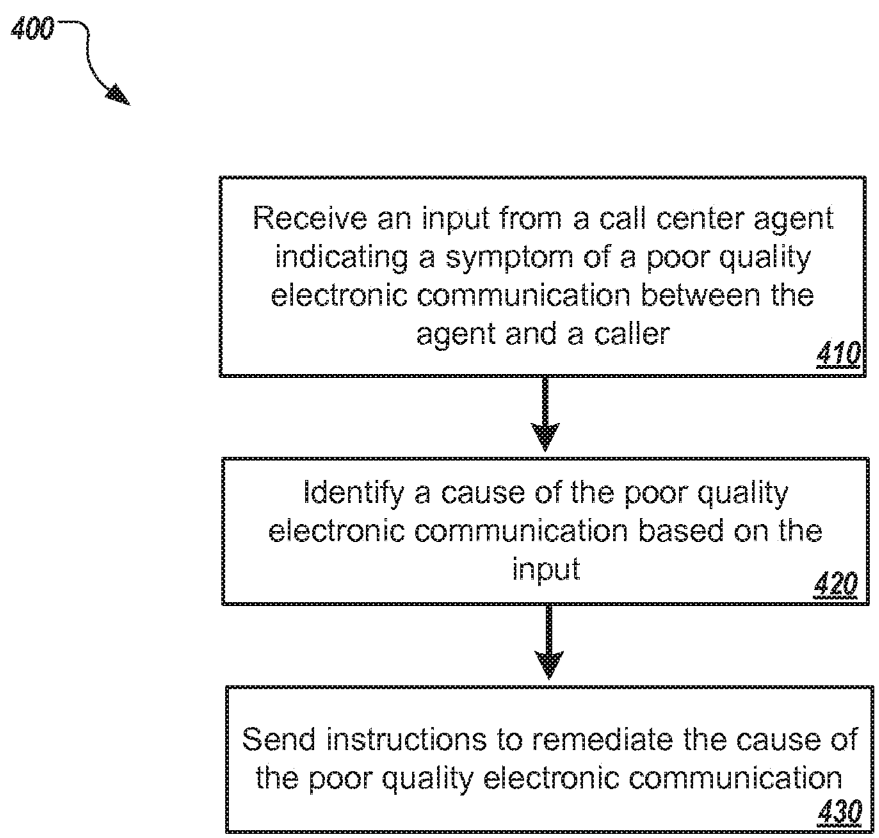
FIG. 4 depicts an example processes that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some examples, the process 400 is executed to remediate the cause of a poor quality electronic communication. In some examples, the process 400 is executed by a call control application executing on a call control system.

An input is received from a call center agent indicating a symptom of a poor quality electronic communication between the agent and a caller (410). For example, the input may be a selection of one or more symptoms from a GUI. A cause of the poor quality electronic communication is identified based on the input (420). The cause of the poor quality electronic communication may be determined based on analysis results obtained from one or more computer analytics performed on the input. Instructions are sent to remediate the cause of the poor quality electronic communication (430). In some examples, the instructions may be sent to one or more servers in the communication path between the communication device 112 in the call center agent's 120 communication device (e.g., agent workstation 126). In some examples, the instructions may be sent to a caller's 102 communication device 112, and may include instructions to change a function or setting of the caller's 102 communication device 112.

In some implementations, one or more performance metrics related to the performance of the electronic communication, the performance of the caller's communication device, or both may be obtained. The poor quality electronic communication may then be determined based on analysis results obtained from one or more computer analytics performed on the input and the one or more performance metrics. Performance metrics may include, for example, a channel MoS, a channel packet loss rate, or a battery charge level, a codec performance metric, a processor performance metric, a number of running processes, a number of running applications, a gain setting, or a packet retransmission rate of the caller's electronic communication device.

In some implementations a notification to be provided for display on the caller's communication device to notify the user that it changes been made to a function or setting of the caller's communication device.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:

establishing an electronic communication between a first user using a first communication device and a second user using a second communication device;

providing, for display to the first user, a graphical user interface including a user selectable list of symptoms related to poor electronic communications quality;

receiving, during the electronic communication and by at least one processor of computing device associated with the first communication device, a selection of an item from the user selectable list of symptoms from the first user, the selected item indicating a symptom of a quality of the electronic communication between the first user, using the first communication device, and the second user, using the second communication device;

identifying, by the at least one processor and based on the input, a cause of the quality of the electronic communication; and sending, during the electronic communication and by the at least one processor, instructions to remediate the cause of the quality of the electronic communication.

2. The method of claim 1, wherein selectable items in the selectable list of symptoms include at least one of the symptoms selected from the list consisting of: choppy, inaudible, static, and too quiet.

3. The method of claim 1, wherein identifying the cause of the quality of the electronic communication comprises:

obtaining, by the at least one processor, at least one performance metric related to the electronic communication; and determining, by the at least one processor, the cause of the quality of the electronic communication based on the selected item and the at least one performance metric.

4. The method of claim 3, wherein identifying the cause of the quality of the electronic communication based on the input and the at least one performance metric comprises obtaining analysis results from at least one analytic performed on selected item and the at least one performance metric.

5. The method of claim 3, wherein the at least one performance metric includes at least one of a mean-opinion score (MoS) or a packet loss rate.

6. The method of claim 2, wherein the at least one performance metric includes a performance metric of the second communication device.

7. The method of claim 6, wherein the performance metric of the second communication device includes at least one of a battery charge level, a codec performance metric, a processor performance metric, a number of running processes, a number of running applications, a gain setting, or a packet retransmission rate.

8. The method of claim 1, wherein the instructions comprise instructions to change a function of the second communication device.

9. The method of claim 1, wherein the instructions comprise instructions to cause the second communication device to adjust a gain setting of the second communication device.

10. The method of claim 1, wherein the instructions comprise instructions to cause the second communication device to close an application running on the second communication device.

11. The method of claim 1, wherein the instructions comprise instructions to a network computing device to establish a redundant communication path for the electronic communication.

12. A call center system comprising:

at least one processor; and a data store coupled to the at least one processor having instructions stored thereon which, when executed by the at least one processor, causes the at least one processor to perform operations comprising:

establishing an electronic communication between a first user using a first communication device and a second user using a second communication device;

providing, for display to the first user, a graphical user interface including a user selectable list of symptoms related to poor electronic communications quality;

receiving, during the electronic communication, a selection of an item from the user selectable list of symptoms from the first user, the selected item indicating a symptom of a quality of the electronic communication between the first user, using the first communication device, and the second user, using the second communication device;

identifying based on the input, a cause of the quality of the electronic communication; and sending, during the electronic communication, instructions to remediate the cause of the quality of the electronic communication.

13. The system of claim 12, wherein identifying the cause of the quality of the electronic communication comprises:

obtaining at least one performance metric related to the electronic communication; and determining the cause of the quality of the electronic communication based on the input and the at least one performance metric.

14. The system of claim 13, wherein the at least one performance metric includes a performance metric of the second communication device.

15. The system of claim 13, wherein identifying the cause of the quality of the electronic communication based on the input and the at least one performance metric comprises obtaining analysis results from at least one analytic performed on selected item and the at least one performance metric.

16. The system of claim 14, wherein the performance metric of the second communication device includes at least one of a battery charge level, a codec performance metric, a processor performance metric, a number of running processes, a number of running applications, a gain setting, or a packet retransmission rate.

17. The system of claim 12, wherein the instructions comprise instructions to change a function of the second communication device.

18. The system of claim 12, wherein the instructions comprise instructions to cause the second communication device to adjust a gain setting of the second communication device.

19. The system of claim 12, wherein the instructions comprise instructions to cause the second communication device to close an application running on the second communication device.

20. The system of claim 12, wherein the instructions comprise instructions to a network computing device to establish a redundant communication path for the electronic communication.

* * * * *